Dec. 15, 1953
F. W. LEFFER
2,662,844
CONVERSION OR CRACKING OF LIGHT AND HEAVY
OIL FRACTIONS IN THE PRESENCE OF
SUBDIVIDED CONTACT MATERIAL
Filed Jan. 19, 1950
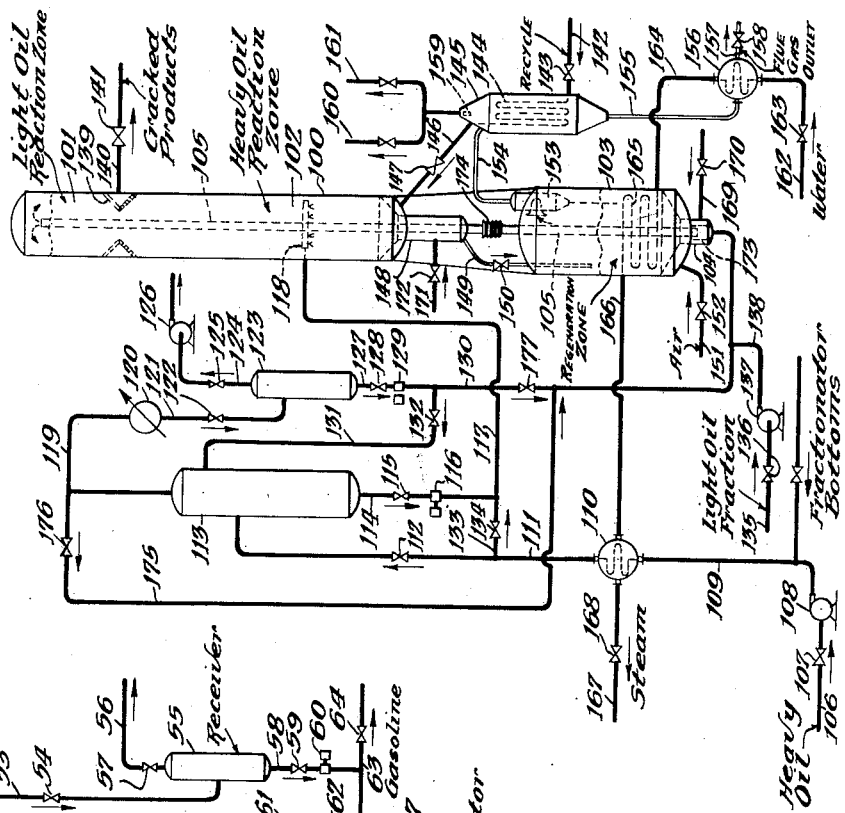
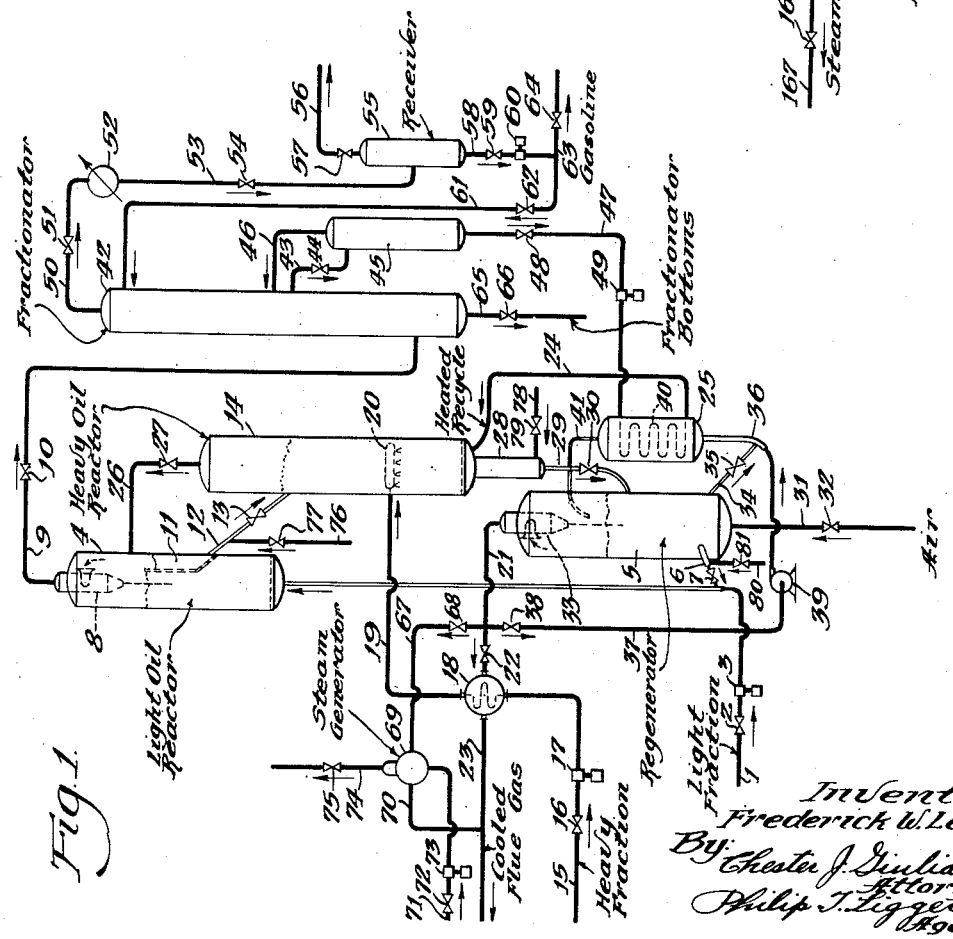
Inventor:
Frederick W. Leffer
By Chester J. Giuliani
Attorney
Philip T. Liggett
Agent Patented Dec. 15, 1953

2,662,844

UNITED STATES PATENT OFFICE 2,662,844

CONVERSION OR CRACKING OF LIGHT AND HEAVY OIL FRACTIONS IN THE PRESENCE OF SUBDIVIDED CONTACT MATERIAL

Frederick W. Leffer, Riverside, Ill., assignor to Universal Oil Products Company, Chicago, Ill., a corporation of Delaware Application January 19, 1950, Serial No. 139,362

16 Claims. (Cl. 196—49)

This invention relates to the conversion of light and heavy oil fractions in the presence of subdivided contact material, or more particularly to catalytic cracking of separate hydrocarbon fractions in the presence of separate catalyst quantities, such as moving or fluidized beds of catalyst, and in a continuous operation maintaining separate reaction zones for each of the different fractions and a single catalyst regeneration zone.

It is generally difficult or impractical to effect the catalytic cracking of heavy hydrocarbon fractions, such as topped or reduced crude, or other residual fractions, because of excessive coking and contamination of the catalyst, as well as excessive production of low grade products. Usually hydrocarbon crudes or residual fractions are subjected to vacuum distillation, propane deasphalting, or other process suitable to remove asphaltenes and coke forming constituents, whereby a relatively light gas-oil is obtained for charging stock to a catalytic cracking unit. However, where relatively light and heavy fractions have been charged to catalytic cracking zones, it has been the general practice to utilize two regenerating zones, or alternately, to withdraw two separate streams of catalyst particles from the regenerator and use different catalyst beds in each of the conversion zones, and the contacted particles are separately returned to the regeneration zone. The present improved operation provides several advantages over the more conventional operations by reason of an improved flow which in turn provides a high temperature conversion in each of two separate catalyst contacting zones and by steps effecting high efficiency through heat economy. A further improvement is provided through an advantageous manner of handling the moving beds or columns of particles, as will hereinafter be more fully explained.

It is a principal object of the invention to maintain separate reaction or conversion zones for each of the light and heavy oil fractions and a single regeneration zone, to provide for passing the contacted particles from the light oil reaction zone into the heavy oil reaction zone, and to provide for heating the subdivided particles in the heavy oil reaction zone whereby the heavy oil fraction may be converted without excessively damaging or coking the particles in the second contacting zone.

It is a further object of the invention to provide a conversion process wherein the catalyst particles are passed continuously from a first reaction zone to a second reaction zone, with means for maintaining a temperature within the second reaction zone equal to or higher than that in the first by introducing a heated recycle stream of a relatively light hydrocarbon fraction to the second reaction zone.

It is another object of the invention to utilize heat produced by the regenerating zone, through the utilization of the flue gas stream, or alternatively through the use of a withdrawn stream of catalyst particles, to effect indirect heating of the recycle stream being discharged to the heavy oil conversion zone, while in addition, excess heat may be utilized to advantage in the pre-heating of the light and heavy oil charge streams.

A still further object of the invention is to utilize an arrangement of superimposed contacting zones whereby the subdivided particles may be carried in a fluidized phase to the upper of the zones and then subsequently permitted to pass in a gravity flow through the first conversion zone, the second reaction zone, and the regeneration zone, and it is also an object of the invention to provide for an apparatus particularly suitable for performing this operation.

Additional objects and advantages of the improved operation and apparatus of the present invention will be apparent in connection with the following discussion and description of the accompanying drawing.

In a broad embodiment, the improved continuous conversion process for converting a light and a heavy residual hydrocarbon fraction, comprises the steps of introducing the light hydrocarbon fraction and freshly regenerated subdivided solid contact material into a first contacting and conversion zone, withdrawing the resulting fluid reaction products and passing the contacted particles to a second contacting and conversion zone, introducing the heavy hydrocarbon fraction into contact with the particles in the second conversion zone and simultaneously introducing a separately heated lower boiling recycle fraction into the second contacting zone, the recycle stream being heated to a temperature sufficient to maintain the second contacting zone at an average temperature substantially equivalent to or higher temperature than that maintained in the first contacting zone, withdrawing fluid conversion products from the second conversion zone and passing the product streams from both the first and second conversion zones to a suitable recovery zone, continuously passing coked and contaminated particles from the second conversion zone to a regeneration zone and therein contacting the particles with an oxygen-containing stream to effect the burning of carbonaceous matter from the particles and the heating of the latter, continuously discharging resulting flue gases from the regeneration zone, and continuously passing freshly regenerated and heated particles from the regeneration zone to the first contacting zone.

The recycle fraction which is to be passed to the second conversion zone and into contact therein with the heavy hydrocarbon fraction, is preferably heated by indirect heat exchange with a hot catalyst stream or hot flue gas. In other words, heat generated within the regeneration or reactivation zone is utilized to sufficiently heat the recycle stream to maintain at least the same, or preferably a slightly higher temperature than the average cracking temperature within the first conversion zone. The recycle fraction is also preferably a relatively light fraction which boils lower than the heavy hydrocarbon charge fraction and is an insufficiently converted product stream withdrawn from a fractionation and recovery section receiving the fluid product streams from the conversion of the light and heavy fractions. Thus, the heated recycle stream may be subjected to a relatively high temperature without causing over cracking or other detrimental effects. Further, in the present catalytic operation, there is effected the cracking and conversion of the light charge stream in the first contacting zone in the presence of catalyst of highest activity and in the absence of any recycle fractions, whereas, the heavier fraction is separately contacted with a less active catalyst but in the presence of a heated recycle fraction which in turn maintains the catalyst and reactants in the second conversion zone at a high temperature within the conversion being effected in a manner to completely decompose the heavy oil fraction into gaseous and vaporous products and a substantially dry residue which may be adsorbed on the solid contacting particles.

The contact material within the second contacting and conversion zone may be maintained in a fluidized dense phase bed, or alternatively in a relatively compact descending bed of particles; preferably the recycle stream is charged to the lower end of the bed within that zone and passes upwardly countercurrently to the particles to insure a relatively uniform heating and drying action on the bed of particles. Also, preferably the heavy fraction is introduced at an intermediate point in the bed of particles of the second contacting zone and uniformly in a manner to preclude any chance of agglomeration of particles, prior to their passing into the regeneration zone.

In a more specific and preferred embodiment of the present improved operation, the contacting zones are arranged such that the separate reaction or conversion zones are elevated above the reactivation or regeneration zone, with the first or light charge fraction conversion zone being elevated above the second conversion zone to which the heavy hydrocarbon fraction is introduced. Thus, a single fluidized lift of the catalyst particles may be made in a continuous manner from the regeneration zone to the first contacting zone, and the subsequent flow of the particles may be made by gravity through the entire length of each of the conversion zones and to the regeneration zone to complete the continuous cycle of particles. Also, preferably, the light hydrocarbon fraction is utilized in vaporous state to carry the particles from the lower end of the regeneration zone to the elevated first contacting zone.

In a compact, efficient, and desired arrangement of the contacting zones, these zones are maintained in superimposed vertical alignment with one another and with an open-ended conduit extending vertically through the central portion of all of the zones, such that the freshly regenerated particles may be carried in a confined straight line path directly to the upper portion of the upper contacting zone and pass the particles in indirect heat exchange with each of the zones during the upward passage of particles to the light oil or first conversion zone. Since the long riser or straight line confined path of the internal conduit provides a conversion zone, affording a substantial period of contact between catalyst and the vapors effecting the transporting of particles into the upper contacting zone, the latter may, in most instances, be of relatively small dimension to insure the substantial completion of the conversion of the light charge stream to the desired cracked components. In the superimposed arrangement, the transported particles may be passed substantially as a shower or descending suspension through the uppermost or first contacting zone and as a descending fluidized or compact moving bed through the second contacting zone and the bed within the regenerating zone and in a heat exchange relationship with the rising stream. Alternatively, the solid particles may be passed as a descending compact moving bed through both the first and second of the superimposed contacting zones. However, in all embodiments the recycle stream is preferably passed to the lower portion of the second reaction and contacting zone such that it passes upwardly countercurrently to the descending bed of catalyst particles therein.

The fluid conversion products from each of the contacting zones may be withdrawn separately and commingled prior to being introduced to a suitable fractionating and recovery unit, or alternatively, the conversion products from the second contacting zone may pass upwardly through the upper portion of the first contacting zone without passing through the catalyst mass in the latter and a commingled product stream passed to the fractionating zone. When utilizing the superimposed arrangement of zones, a commingled stream of the fluid conversion products may be withdrawn from a level intermediate the first and second contacting zones, such that the conversion products of the light charge fraction are withdrawn after passing downwardly in the upper contacting zone concurrently with descending particles therein and the fluid conversion products obtained in the second contacting zone are withdrawn therefrom after they have passed upwardly through that zone countercurrently to the descending bed of particles.

In all modes of operation, the heavy residual oil fraction is pre-heated to a temperature, preferably of the order of about 750° to 825° F., precluding coking in the transfer lines and distributing header which may be used to introduce the stream substantially uniformly into an intermediate portion of the bed in the second contacting zone. Thus, the destructive dry distillation and exhaustive cracking of the heavy oil fraction does not occur until after it has been distributed into the bed of subdivided catalyst particles, and normally, the heavy oil stream being introduced into the bed of particles is at least partly in a liquid state.

As hereinbefore noted, the catalyst bed in the second reaction zone is maintained at a relatively high cracking temperature by means of the heating of the recycle stream being introduced thereto, with an average bed temperature of the order of 950° F. maintained to effect the desired conversion. The light hydrocarbon fraction may or may not be pre-heated prior to introduction into the commingled state with the freshly regenerated catalyst particles, however, the hot catalyst will effect a substantially complete vaporization of the light fraction immediately upon contact therewith, such that the light oil stream may be utilized to advantage as a fluidizing medium to aid in transferring the catalyst or contacting particles into an elevated reaction zone. The catalyst withdrawal temperature and the charge stream preheating may be regulated to effect the catalytic conversion within the first contacting zone at an average temperature of about 880–925° F.

The combined cracking operations of the present invention provide through the two-stage contacting, and through the contacting of a heavy hydrocarbon stream, a relatively large amount of deposition of carbonaceous material on the subdivided contact material such that extensive oxidation and burning is carried out within the regeneration zone. Control of the temperature within the regeneration zone may be effected, as hereinafter described more fully with reference to the drawing, by steam generation from an aqueous stream passing in indirect heat exchange with the catalyst from the regenerating zone.

The operation of the improved processing of this invention and additional advantages and features thereof will be more apparent upon reference to the accompanying drawing and the following description thereof.

Figure 1 of the drawing is a diagrammatic elevational view of one embodiment of the present invention, which utilizes two separate reaction zones and a single regeneration zone for effecting the contacting and conversion of separate light and heavy oil fractions.

Figure 2 of the drawing indicates diagrammatically another embodiment of the combined operation for effecting the conversion of light and heavy oil hydrocarbon streams, with a desirable vertically superimposed arrangement of contacting zones, and in addition thereto, with means for effecting the vacuum distillation or other preliminary separation of the heavy residual fraction prior to introducing separate light and heavy oil streams into the separate conversion zones.

Referring now to Figure 1 of the drawing, there is indicated a line 1, having a control valve 2 and pump 3, suitable to introduce a light oil charge stream into an elevated reaction zone 4 together with freshly regenerated catalyst or subdivided contact material which is discharged from the lower portion of the regenerator 5 by way of a line 6 and control valve 7. The light oil fraction is preferably a gas-oil or lighter hydrocarbon stream and may or may not be a fraction recovered from a fractionating and recovery unit maintained in connection with the present conversion system. It will be assumed in the following description, relating to the flow and operation of the present improved unit, that the hydrocarbon oil streams are being catalytically cracked to desired products in the presence of suitable subdivided or prepared microspherical catalyst particles, of silica-alumina, silica-magnesia, silica-alumina-zirconia, or other cracking catalysts, now well known to those familiar with the cracking arts.

In the present arrangement and operation, the light oil fraction, either pre-heated, or vaporized upon contact with the hot subdivided catalyst, provides a vaporous stream suitable to fluidize and carry the particles upwardly to the elevated reaction zone 4, wherein a fluidized bed of the particles effects further desired uniform contacting of the vapors and a substantially complete conversion to desired cracked products. Conversion products are withdrawn through a suitable particle separator 8 and subsequently discharged by way of line 9 having control valve 10, with recovered finely divided entrained particles being continuously returned to the bed in the lower portion of the chamber 4 through a suitable dip leg at the bottom of the separator 8. It may be pointed out, that the comparative sizes of the contacting chambers which are shown in the drawing are not to be considered limiting in any manner; for in many operations it may be possible to use a relatively small reactor 4, particularly where a considerable portion of the catalytic conversion takes place in a long riser line extending from a low regeneration chamber to a highly elevated reaction chamber. The temperature within the light oil conversion zone may range from about 850° F. to 950° F. with an average of about 900°, and with catalyst to oil ratios and contact time such as to provide optimum cracking conditions.

The contacted catalyst particles are continuously withdrawn from reaction zone 4 by way of a withdrawal well 11, conduit 12 and control valve 13. Preferably, a continuous gravity flow or transfer of particles is maintained from the upper reactor 4 into the heavy oil reactor 14, with the particles being discharged into the upper portion of a descending bed maintained in the lower portion of that zone. A heavy residual oil fraction, such as topped or reduced crude, is charged by way of line 15, valve 16, pump 17, heat exchanger 18 and line 19 to the interior and intermediate portion of the descending bed of particles maintained in the reactor 14. Also preferably, the heavy fraction is uniformly distributed into the bed of catalyst or particles by way of a suitable distributing head or ring 20. The present arrangement indicates a hot flue gas stream, discharged from the upper portion of the regenerator 5 by way of line 21 and valve 22, as passing through heat exchanger 18 in a manner to pre-heat the heavy oil charge stream to a desired high temperature, which however, precludes coking in the heat exchanger coil or transfer line. This heat exchange operation also permits the flue gas stream to be discharged to the atmosphere by way of line 23 at a substantially lower temperature than the exit temperature from the regenerator zone.

In accordance with the present invention, a heated recycle stream, which is preferably an insufficiently converted light fraction having a substantially lower boiling range than the heavy oil fraction being introduced into the bed of reactor 14, is also charged to this reactor, with the recycle stream providing heat and maintaining an average bed temperature within reactor 14 equivalent to or higher than the temperature within the light oil reactor 4. Preferably, the recycle stream is introduced at the lower end of the reactor 14, such as by way of line 24 passing from a heat exchanger 25. The upwardly flowing recycle vapors in the reactor 14 effect a countercurrent contacting of the particles and maintain a high temperature zone within the lower portion of the chamber such that the heavy hydrocarbon oil fraction is substantially decomposed into the desired vaporous and gaseous components and the residual coke is adequately dried in a moving or fluidized bed operation that prevents agglomeration of the particles prior to their passage into the regeneration zone.

In the present embodiment, the vaporous products leave the upper portion of the heavy oil reactor 14 by way of line 26 and valve 27 to commingle with the conversion product in the upper portion of the light oil reaction zone 4 and thus pass through particle separator 8 and discharge line 9 to a suitable fractionating zone. The coked and contaminated catalyst particles passing downwardly through zone 14 are withdrawn by way of a lower stripping leg 28 and standpipe 29 having control valve 30, and are continuously introduced into a moving or fluidized bed of particles maintained within a lower portion of the regenerator 5, preferably into the upper portion of such bed so as to secure an essentially countercurrent flow regeneration treatment. Air is continuously introduced to the lower end of the generator by way of line 31 and control valve 32 such that the contaminated catalyst may be oxidized and burned to effect the removal of the coke-like material. Reactivated and reheated particles are continuously withdrawn from the regenerator by way of the line 6 as hereintofore noted, while resulting flue gas is passed from the upper portion of the regeneration zone by way of particle separator 33 and the discharge line 21.

The present embodiment provides for the continuous withdrawal of a catalyst stream from the bed within regenerator 5 by way of line 34 having control valve 35 and its subsequent introduction into heat exchanger 25 by way of riser line 36. Thus, heat generated within the catalyst bed is utilized within the heat exchanger 25 to effect the high temperature heating of the recycle stream which is charged by way of line 24 to the heavy oil reactor 14. Also, the continuous passage of a stream of catalyst through the heat exchanger provides means for controlling the temperature within the bed of particles of regenerator 5 and the prevention of excessively high temperatures that would damage the catalysts during the oxidizing and burning operation carried out in the presence of air and oxygen within the regenerator. A portion of the discharged hot flue gas stream is passed from line 21 by way of line 37 having control valve 38, and a suitable blower 39 to the riser line 36, whereby a fluidized transporting of hot catalyst particles is effected through the heat exchanger 25 in an indirect heat exchange relationship with a coil 40 within the heat exchanger. Cooled catalyst and flue gas are subsequently returned by way of line 41 to the upper portion of the regenerating zone 5.

In Figure 1 of the drawing, a substantially conventional fractionating and recovery zone is indicated as accommodating the commingled vaporous products passing by way of line 9 to fractionator 42. A desirable light oil recycle stream is withdrawn by way of line 43 having valve 44 and connecting with a suitable recycle accumulator 45, which in turn has means to return gaseous and vaporous components to the fractionator by way of line 46 and pass the desired liquid recycle stream by way of line 47, having control valve 48, and pump 49 to the heat exchanger 25.

The light overhead product from the fractionator 42 is discharged by way of line 50 having valve 51 to a suitable condenser 52, and from the latter by way of line 53 and valve 54 to a receiver 55. Uncondensed gases and vapors are discharged overhead from the receiver 55 through line 56 and valve 57, while condensed gasoline fractions are discharged by way of line 58, valve 59, and pump 60. A portion of the condensate is passed by way of line 61 and valve 62 as reflux to the upper end of the fractionator 42, while the net product stream passes from the pump 60 by way of line 63 and valve 64 to further treating or storage equipment.

Fractionator bottoms are passed from the lower end of the fractionator 42 by way of the line 65 and valve 66. It should be noted, however, that within the scope of the present invention, all or a portion of the fractionated bottoms may be passed to the charge line 15 as a portion of the heavy oil charge stream.

The present embodiment also makes provision for utilizing excess heat from the flue gas stream to generate steam which may be utilized advantageously in connection with this catalytic processing unit, or other refinery units. A portion of the hot flue gas stream is indicated as being passed by way of line 67 having control valve 68 to a suitable steam generator 69, from which the cooled gas stream passes by way of line 70 to the outlet line 23. Water is charged to the steam generator by way of line 71, valve 72, and pump 73, while provision is made for withdrawing the resulting steam by way of line 74 having control valve 75.

Steam may be used advantageously as a stripping medium in the catalytic unit, for example, steam may be passed to the catalyst transfer line 12 by way of line 76 and control valve 77, in order to preclude compacting of the catalyst in this transfer line and to remove entrained hydrocarbon vapors from the catalyst passing from the first reaction zone to the second or heavy oil reaction zone. Stripping steam may also be passed by way of line 78 and control valve 79 to the withdrawal leg 28 which extends below the heavy oil reactor 14 and is advantageously used to strip hydrocarbon vapors from the used catalyst passing to the regenerating zone. In still another instance stripping steam may be passed by way of line 80 and control valve 81 to the catalyst withdrawal leg 6 which transfers regenerated catalyst to the riser line 1 connecting with the light oil reactor 4.

Referring now to Figure 2 of the drawing, there is indicated a modified embodiment of the present invention, which provides improved means for effecting the separate conversion of light and heavy oil fractions in the presence of a solid catalyst or other subdivided contacting material. In a desirable and preferable arrangement of zones for contacting the hydrocarbon fractions with the catalyst, there is provided a vertically superimposed compact arrangement having a single upper chamber 100, housing an upper light oil reaction zone 101 and a lower heavy oil reaction zone 102. A regenerator 103 is positioned directly below the chamber 100. This regenerator has a catalyst withdrawal leg 104 extending from the lower portion thereof, and from the interior of the leg an open-ended conduit 105 extends vertically upwardly through the entire height of the regeneration zone and the lower contacting zone 102 to near the top of the reactor 100 such that the freshly regenerated catalyst may be carried directly upwardly in a straight confined path to the top portion of the first reaction zone 101, as will hereinafter be more fully described.

The present embodiment of Figure 2 permits charging a reduced crude or other heavy hydrocarbon oil fraction to the catalytic processing unit by way of line 106, valve 107, pump 108 and line 109 to a heat exchanger 110, from which the heavy heated charge stream may be passed by way of line 111 and control valve 112 to fractionator 113. Therein, the heated charge stream may be fractionated to provide a light hydrocarbon fraction and a heavy bottoms stream, the latter being withdrawn by way of line 113, having valve 114, pump 116, and line 117 connecting to a suitable distributing header 118 which is positioned at an intermediate point within the heavy oil reaction zone 102. The light overhead stream is discharged by way of line 119, condenser or cooler 120, and line 121 having control valve 122 and connecting to a suitable distillate accumulator 123. The overhead uncondensed vapors and gases from the accumulator 123 may be withdrawn by way of line 124, valve 125, and pump 126. If desired, a suitable vacuum producing pump may be utilized in connection with the unit as that pump 126, to operate the fractionating unit as a vacuum distilling tower.

The condensed distillate from accumulator 123 is withdrawn by way of line 127, valve 128, pump 129, line 130, and valve 177 whereby to provide a light oil charge stream to the present catalytic conversion unit. The light oil stream is discharged upwardly into the open-ended conduit 105 in a manner to contact and fluidize or suspend the hot freshly regenerated catalyst particles and pass them upwardly in a straight confined path to the upper portion of the light oil reactor 101. A portion of the light oil stream from the accumulator 123 may be passed as a reflux stream from line 130, by way of line 131 and valve 132, into the upper portion of the fractionator 113.

In an alternative mode of operation, wherein the fractionation of an initial hydrocarbon oil charge into light and heavy oil fractions to be cracked is effected in the fractionator 113 under a pressure higher than the pressure maintained in the reactor 100, a regulated portion of the fractionated vapors is directed from line 119 to the condenser 120 to provide sufficient dephlegmating condensate for supply through line 131 to the upper portion of the fractionator 113 while the remaining or net portion of the fractionated vapors is passed from line 119 directly and substantially without intentional cooling through line 175, control valve 176 and line 130 to the catalytic conversion unit, the valve 177 in line 130 remaining closed in this mode of operation.

In a further alternative operation, a suitable heavy oil fraction may, of course, be charged directly from the heat exchanger 110 and line 111 by way of line 133 having control valve 134 to the charge line 117, whereby the fraction may be charged directly into the heavy oil reactor 102. Also, means are provided by way of line 135, valve 136, pump 137 and line 138 for introducing a suitable light oil fraction directly to the catalytic unit by way of line 139. This means of charging hydrocarbon fractions to the unit may be utilized, of course, where it is not necessary to fractionate or vacuum distill or otherwise process the initial heavy oil charge.

In the present flow arrangement, the suspension of catalyst in light hydrocarbon vapors is discharged from the conduit 105 into the upper portion of the light oil reactor 101 and the vapors pass downwardly in the latter concurrently with the contacted catalyst particles to a separation zone provided by suitable baffling means 139, which in turn has suitable perforate openings in the lower portion thereof to allow vaporous conversion products to be withdrawn from the unit by way of line 140 and control valve 141. When operating with a relatively compact descending bed in the reactor 100, the upper level of such bed may be maintained at any suitable height below the discharge end of conduit 105, and this level may if so desired be maintained below the baffling means 139. Alternatively, when maintaining a fluidized dense phase bed of catalyst in the reactor 100, the upper level of such bed will be maintained below the baffling means 139. In either mode of operation, the upper level of the descending bed is preferably maintained above the distributing header 118. The once contacted catalyst particles continue in a gravity descent from the light oil reaction zone 101 into the heavy oil reaction zone 102. As in the embodiment of Figure 1 and in accordance with the preferred operation of the present invention, the heavy oil fraction is charged intermediately into the bed of particles in the second reaction zone, and also preferably in a heated state, which precludes coking. In addition, a heated lower boiling fraction, which is preferably a recycle stream from the cracked product fractionating and recovery unit of the plant, is passed to the lower portion of the heavy oil reaction zone and passes upwardly countercurrently to the descending bed of catalyst particles at a temperature sufficiently high to maintain an average temperature in the zone 102 which is at least equal to, and preferably above that maintained in the first contacting zone where the light oil fraction contacts the freshly regenerated catalyst particles. A fractionating and recovery zone is not indicated in Figure 2 of the drawing but may be a conventional recovery unit substantially as shown diagrammatically in Figure 1 to the right of line 9 (the latter corresponding to the line 140 of Figure 2), or as may be desired to recover the desired product streams. Recycle is charged by way of line 142, valve 143 and coil 144 within a suitable heat exchanger 145, to a transfer line 146, having control valve 147 and connecting with the lower end of the heavy oil reaction zone 102 in the reactor 100. The present arrangement provides for withdrawing the resulting conversion products from the upper portion of the heavy oil reaction zone 102 in a commingled state with the conversion products of the upper light oil reaction zone 101.

The coked contaminated catalyst particles are discharged from the lower end of the heavy oil reaction zone by way of withdrawal leg 148, and transfer line 149 having control valve 150, from which they are discharged into the regeneration zone 103. In the present arrangement, air or another free oxygen-containing regenerating gas stream is passed countercurrently upwardly against the descending bed of catalyst particles in the regenerator by way of line 151 and control valve 152. Also, in accordance with the present embodiment, resulting hot combustion and flue gases are discharged from the upper end of the regenerator 103 by way of particle separator 153 and discharge line 154 which connects directly to the heat exchanger 145. Thus, hot combustion gases pass in indirect heat exchange relationship with the coil 144 which accommodates the recycle stream charged to the heavy oil reaction zone. The resulting flue gas stream, being discharged from the lower end of the heat exchanger 145 by way of line 155, passes to a suitable heat exchanger 156, and from the latter by way of outlet line 157 and control valve 158 to the atmosphere or to other desired heat exchange equipment.

It may also be noted that where insufficient heat is supplied by way of the flue gas stream passing through heat exchanger 145, auxiliary heat may be supplied through a burner 159 which is in turn supplied with fuel and air by way of lines 160 and 161 respectively. However, in the present heavy oil conversion operation, a considerable quantity of coke is deposited on the catalyst and there is in turn a considerable amount of heat generated within the regenerator 103 in effecting the removal of the contaminating coke material, such that sufficient excess heat is usually available to effect the required heating of the recycle stream charged to the heavy oil reaction zone and in addition provide for the heating of steam which which may be used advantageously for heat exchange purposes as well as for stripping catalyst withdrawal streams. In the present embodiment, water is passed by way of line 162 and control valve 163 to the heat exchanger 156 in the form of a steam generator, from which low pressure steam may be passed via line 164 to a heating coil 165 that is placed directly within the regenerating zone. This provides for the control of excessive temperatures within the regenerating zone that might cause overheating and damaging of the catalyst particles, while at the same time high temperature steam may be passed by way of line 166 to the heat exchanger 110, which in this embodiment provides for the preheating of the heavy oil charge stream as hereinbefore noted. Cooled steam is discharged from the heat exchanger 110 by way of outlet line 167 and control valve 168. Excess high temperature steam drawn from line 166 at any suitable point thereof (not shown) may be utilized to advantage in the stripping of the freshly regenerated catalyst particles at the outlet leg 104, being supplied by way of line 169 and valve 170. High temperature steam may also be introduced to the withdrawal leg 148, at the lower end of the heavy oil reaction zone 102, by way of charge line 171 having control valve 172.

It is not intended to limit the embodiment of Figure 2, to the exact processing means indicated; for example, the recycle stream may be heated as indicated in Figure 1 of the drawing, by utilizing a hot stream of catalyst particles transported by a flue gas stream through a heat exchanger wherein the hot solid material is passed into heat exchange relationship with the recycle stream. Also, other means may be utilized for pre-heating or pre-fractionating the heavy residual stream prior to introduction as separate light and heavy oil streams to the separate cracking or conversion zones.

While the present invention is particularly advantageous for the selective cracking of light and heavy hydrocarbon fractions, it is not intended to limit the present arrangement of zones and method of processing to cracking alone, for other two stage hydrocarbon conversion processes, such as for example destructive hydrogenation, may be equally advantageously carried out in accordance with the present operation. The present cracking operations are preferably effected at a moderate superatmospheric pressure sufficient to assure performance of the fractionation of the various cracked products at a pressure of the order of 15 to 150 pounds per square inch, without necessitating a vapor compression stage between the cracking and fractionating sections.

In the embodiment of Figure 2 of the drawing, it is a particular feature to conserve heat by disposing the riser line 105 directly within each of the contacting zones, such that there is an indirect heat exchange between the rising particle stream and the contact beds or catalyst suspensions within the superimposed zones. Mechanical means 173 may be provided for adjusting the quantity or rate of flow of freshly regenerated catalysts into the lower open end of the riser conduit 105. Also, in the arrangement of superimposed contact chambers the upper chamber 109 may be supported by a skirt or other means from the lower regenerating chamber, and an expansion joint 174 may be advantageously used in the riser conduit 105, as shown, between the regenerator and the lower end of the upper chamber.

I claim as my invention:

1. A continuous process for separately converting light and heavy hydrocarbon fractions in the presence of subdivided contact material, wherein a single heating and regeneration zone for the combustion of carbonaceous contaminants from said contact material and separate conversion zones are utilized and the subdivided particles are continuously passed from one contacting zone to another, the improvement which comprises, passing the freshly regenerated and heated particles to a first conversion zone and into contact therein with a charge the hydrocarbon content of which consists solely of said light hydrocarbon fraction, separating resulting fluid conversion products from the contacted particles and discharging them from the first conversion zone into a fractionating zone, continuously passing contacted particles upon their separation from said fluid products from the first to a second contacting and conversion zone and therein contacting them first with said heavy hydrocarbon fraction and then countercurrently with a heated lower boiling recycle stream, said recycle stream being heated to a temperature sufficient to maintain said second contacting zone at an average temperature at least equal to that maintained within said first contacting zone, separating resulting fluid conversion products from the solid particles in said second contacting zone and commingling them with the separated fluid products being discharged from said first conversion zone into said fractionating zone, and continuously passing resulting coked and contaminated subdivided particles from said second contacting zone to said regeneration zone.

2. In a continuous catalytic conversion process wherein separate light and heavy hydrocarbon fractions are contacted with subdivided catalyst particles in separate contacting zones and contaminated catalyst particles are reactivated within a single separate regeneration zone in the presence of an oxygen-containing regenerating gas stream, and wherein the subdivided catalyst particles are continuously passed from one contacting zone to another, the improvement which comprises, passing the freshly regenerated and heated particles to a first contacting zone and therein contacting them with a charge the hydrocarbon content of which consists solely of said light hydrocarbon fraction, separating resulting fluid conversion products from the contacted particles and discharging them from the first contacting zone into a fractionating zone, continuously passing contacted particles from said first contacting zone to the upper portion of a second contacting zone, uniformly introducing said heavy hydrocarbon fraction intermediately into a descending bed of particles in said second contacting zone while simultaneously separately introducing into the lower portion thereof and into countercurrent contact with said particles therein a heated recycle stream, said recycle stream being heated to a temperature maintaining said second contacting zone at an average temperature above that within said first contacting zone, thereby effecting the conversion of both said recycle stream and said heavy hydrocarbon fraction, withdrawing resulting fluid conversion products from the upper portion of said second contacting zone and commingling them with the separated fluid products being discharged from the first contacting zone into said fractionating zone, and continuously passing resulting coked and contaminated subdivided particles from the lower portion of said contacting zone to said regenerating zone.

3. In a continuous catalytic conversion process wherein relatively light and heavy hydrocarbon fractions are contacted with subdivided catalyst particles in separate reaction zones and contaminated catalyst particles are reactivated in a separate regeneration zone in the presence of an oxygen-containing regenerating gas stream, and wherein the catalyst particles are continuously passed from one contacting zone to another, the improvement which comprises, introducing heated and freshly regenerated catalyst particles and a hydrocarbon charge consisting solely of said light hydrocarbon fraction to a first reaction zone, effecting the catalytic conversion of said fraction therein and continuously separating resulting fluid conversion products from the contacted particles and discharging them from said first reaction zone into a fractionating and recovery zone while continuously passing said contacted catalyst particles to a second reaction zone, introducing said heavier hydrocarbon fraction intermediately into a bed of catalyst particles descending within the latter zone while simultaneously countercurrently contacting said bed with a heated recycle stream of an insufficiently converted lower boiling fraction, said heated recycle being introduced to the lower portion of said descending bed at a high temperature whereby to maintain said second reaction zone at an average contacting temperature above that within said first reaction zone, withdrawing resulting fluid conversion products from said second reaction zone and commingling them with the separated fluid product stream being discharged from said first reaction zone into said fractionating and recovery zone, continuously withdrawing resulting coked and contaminated catalyst particles from the lower portion of said second reaction zone and passing them to said regeneration zone, effecting the contacting of the catalyst particles in said regeneration zone with a gas stream containing free oxygen and effecting the continuous burning and removal of coke from said particles, discharging resulting flue gases from the upper portion of said regeneration zone, and passing regenerated catalyst to said first reaction zone in the aforesaid manner.

4. The process of claim 3 further characterized in that said recycle stream is heated by indirect heat exchange with hot catalyst particles withdrawn from said regeneration zone.

5. The process of claim 3 further characterized in that said recycle stream is heated by indirect heat exchange with hot flue gases being withdrawn from the upper portion of said regeneration zone.

6. A continuous catalytic conversion process which comprises passing heated and freely reactivated subdivided particles of catalyst from a regeneration zone to an elevated first reaction zone together with a hydrocarbon charge consisting solely of a light hydrocarbon fraction, effecting the catalytic conversion of the latter at cracking conditions and discharging resulting vaporous cracked products from the upper portion of said first reaction zone into a fractionating and recovery zone, continuously passing contacted catalyst particles from said first reaction zone in a gravity flow to a second reaction zone, introducing a heavy residual hydrocarbon fraction uniformly and intermediately into a descending bed of particles maintained within said second reaction zone, simultaneously and continuously introducing to the lower portion of said second reaction zone a heated recycle hydrocarbon stream and countercurrently contacting said descending bed of catalyst therein, said recycle stream being lower boiling than said heavy hydrocarbon fraction and heated to a high temperature whereby to maintain said catalyst bed in said second reaction zone at an average temperature above that maintained within said first reaction zone, withdrawing resulting vaporous conversion products from said second reaction zone and commingling them with the vaporous products being discharged from said first reaction zone, continuously withdrawing the resulting contacted catalyst particles from said second reaction zone and passing them in a gravity flow to a lower elevation regeneration zone, contacting said particles in the latter zone with a gas stream containing free oxygen and effecting the burning and removal of coke from said particles, continuously discharging resulting flue gases from said regeneration zone, and continuously withdrawing the reactivated catalyst particles therefrom and passing them to said first reaction zone in the aforesaid manner.

7. The process of claim 6 further characterized in that said light hydrocarbon fraction is vaporized and effects a fluidized transporting of the heated and freshly reactivated catalyst from said regeneration zone to the lower portion of said first reaction zone and is contacted with a fluidized bed maintained therein, the resulting contacted particles pass in a gravity flow to the upper portion of said second reaction zone while said recycle stream is introduced at the lower portion of said second reaction zone at a velocity sufficient to maintain a fluidized particle bed in the latter zone, while said heavy hydrocarbon stream is introduced intermediately into said fluidized bed of catalyst particles.

8. The process of claim 7 further characterized in that a fluidized bed of contacted particles is maintained within said regeneration zone, said particles are passed from said second reaction zone to the upper portion of the fluidized bed maintained in the lower portion of said regeneration zone, and said oxygen-containing gas stream is introduced to the lower portion thereof countercurrently to the continuously descending fluidized bed therein.

9. In a continuous catalytic conversion process wherein light and heavy hydrocarbon fractions are separately contacted with subdivided catalyst particles in separate contacting zones and contaminated catalyst particles are reactivated within a separate regeneration zone with a free oxygen-containing gas stream, and wherein particles are continuously passed from one contacting zone to another, the improvement which comprises, maintaining the different contacting zones in vertical alignment with one another, passing freshly reactivated catalyst particles in a fluidized phase upwardly in a straight line confined path through a lower positioned regeneration zone and through substantially the entire length of each of the superimposed reaction zones, with said light hydrocarbon fraction being introduced at the lower end of said regeneration zone to commingle with and transfer said particles in an ascending straight line suspensoid column to a first reaction zone, passing the resulting particles downwardly from the upper portion of said first reaction zone through the upper reaction zone and into a second reaction zone positioned therebelow, introducing a heavy hydrocarbon oil fraction intermediately into a bed of particles descending through the second reaction zone, continuously introducing a highly heated stream of a recycle oil fraction boiling lower than said heavy oil fraction into the lower portion of said second reaction zone, said recycle stream passing countercurrently to said descending subdivided particles and providing a heating of the bed within the lower reaction zone to a temperature at least as high as that maintained within the upper reaction zone, continuously withdrawing resulting vaporous conversion products from each of the contacting zones as a commingled product stream at a point intermediate said upper reaction zone and said second reaction zone and passing said commingled stream to a fractionating zone, continuously passing contacted and contaminated particles from the lower end of said second reaction zone into said regeneration zone positioned therebelow, introducing said oxygen-containing gas to said regeneration zone countercurrently to the particles descending therethrough and effecting the burning and removal of carbonaceous matter from the subdivided particles therein, continuously discharging resulting hot combustion gases from the upper portion of the regeneration zone, and continuously passing reactivated subdivided particles from the lower portion of said regeneration zone to the lower end of said straight confined column as hereinbefore set forth.

10. The process of claim 9 further characterized in that said hot combustion gases are passed in indirect heat exchange with the recycle stream being introduced into the lower end of said second reaction zone whereby to provide a high temperature recycle stream and to maintain a temperature within the lower reaction zone higher than that in said first reaction zone.

11. A unitary apparatus suitable for effecting the conversion of two different reactant streams in the presence of subdivided solid contact material and within separate conversion zones, which comprises in combination, an elongated vertically disposed and confined upper chamber superimposed above and in vertical alignment with a vertically disposed and confined lower chamber, a continuous open-ended conduit extending vertically upward from the lower end of said lower chamber to near the upper end of said superimposed upper chamber, said conduit extending through the interior of each of said chambers, fluid inlet means projecting through the lower end of said lower chamber into the lower end of said open-ended conduit and providing for the fluidized transfer of subdivided particles from the lower end of the lower chamber to the upper end of the superimposed chamber, perforate baffling means intermediately positioned within said superimposed upper chamber dividing the latter into upper and lower contacting sections, said baffling means extending inwardly of the wall of said upper chamber and terminating short of said open-ended conduit and being constructed and arranged to form a withdrawal header with the inner wall of the upper chamber, fluid outlet means connecting with said withdrawal header for removing fluid products from both the upper and lower contacting sections of said upper chamber, fluid inlet means communicating with an intermediate portion of said lower section of said upper chamber, additional fluid inlet means connecting with the lower portion of said lower contacting section of said upper chamber, a particle withdrawal conduit extending from the lower portion of said lower section of the upper chamber to the interior of said lower chamber, whereby contacted particles may be passed from the upper chamber to the lower, fluid inlet means to said lower chamber out of alignment with said open-ended conduit, and fluid outlet means from the upper portion of said lower chamber whereby to permit the flow of a fluid medium countercurrently upwardly through a contact bed of material descending in said lower chamber.

12. The apparatus of claim 11 further characterized by flow regulating means positioned at the lower end of said open-ended conduit and within said particle withdrawal conduit for the passage of particles from the lower end of the upper chamber to the interior of the lower chamber 13. The apparatus of claim 11 further characterised in that said open-ended conduit is positioned concentrically within each of the superimposed chambers so as to provide annular shaped contacting sections within each of said chambers and a heat exchange relationship of said conduit with each of said contacting sections.

14. The apparatus of claim 11 further characterized in that conduit means connects said fluid outlet from the said lower chamber with a heat exchanger, and conduit means within said heat exchanger connects with said additional fluid inlet at the lower end of the lower section of said upper chamber and provides for indirect heat exchange between the fluid stream passing from said lower chamber through said heat exchanger and said stream to be introduced to the lower end of said upper chamber.

15. The improvement as defined in claim 1 further characterized in that said recycle stream is heated by indirect heat exchange with hot material withdrawn from said regeneration zone.

16. An apparatus of the character described comprising an elongated vertically disposed and confined upper chamber superimposed above and vertically aligned with a vertically disposed and confined lower chamber, a vertical conduit extending from below the lower chamber through the latter and through a major portion of the height of the upper chamber, means for removing solid particles from the lower portion of the lower chamber and for introducing them to the lower end of said vertical conduit, a fluid inlet communicating with the lower end of the vertical conduit and providing for the fluidized transfer of solid particles through the vertical conduit into the top portion of the upper chamber, a solid particle discharge well extending downwardly from the bottom portion of the upper chamber and having a vertical wall member concentrically spaced from an intermediate portion of the vertical conduit so as to form together with said intermediate conduit portion an annular particle downflow passageway communicating with the lower chamber and of substantially smaller cross-section than each of said chambers, fluid inlet means at the bottom portion of the upper chamber, a single withdrawal header within the upper chamber for withdrawing fluid products from both the lower and upper portions of the upper chamber, said single withdrawal header being spaced a substantial distance above the lower end of the upper chamber and below said upper end of the vertical conduit, fluid outlet means connected to said withdrawal header for discharging fluid products from said header and the upper chamber, and fluid inlet and outlet means at vertically spaced points of said lower chamber.

FREDERICK W. LEFFER.

References Cited in the file of this patent

UNITED STATES PATENTS

| Number | Name | Date |
|---|---|---|
| 2,379,966 | Johnson | July 10, 1945 |
| 2,406,555 | Martin | Aug. 27, 1946 |
| 2,412,152 | Huff | Dec. 3, 1946 |
| 2,440,475 | Jacomini | Apr. 27, 1948 |
| 2,460,404 | Ward | Feb. 1, 1949 |
| 2,461,958 | Bonnell | Feb. 15, 1949 |
| 2,488,713 | Seguy | Nov. 22, 1949 |